Feb. 3, 1970  E. S. KNUDSEN  3,493,774
METHODS OF DETERMINING THE QUALITY OF MEAT AND DEVICES
FOR CARRYING OUT SAID METHODS
Filed Aug. 14, 1967
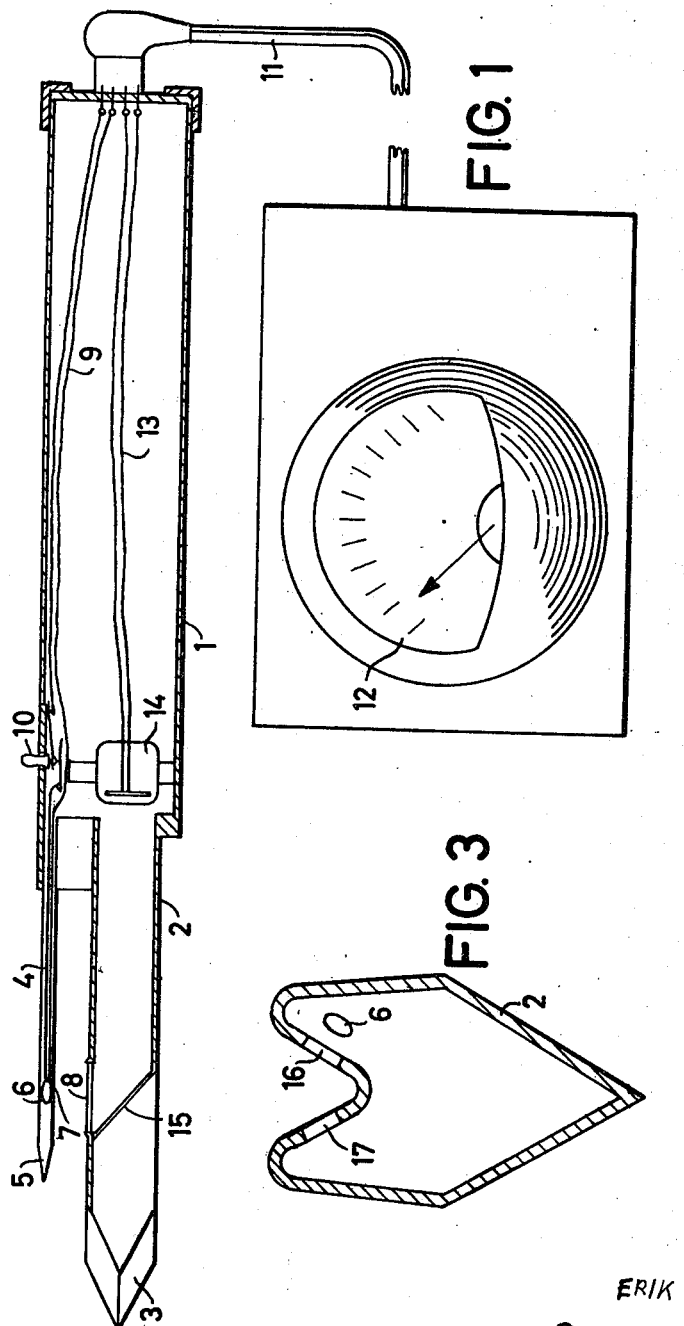
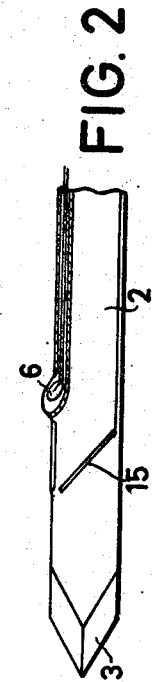
INVENTOR
ERIK STENBERG KNUDSEN
BY Stevens, Davis, Miller & Mosher
ATTORNEYS 3,493,774
METHODS OF DETERMINING THE QUALITY OF MEAT AND DEVICES FOR CARRYING OUT SAID METHODS
Erik Stenberg Knudsen, Himmelev, Denmark, assignor to Slagteriernes Forskningsinstitut, Roskilde, Denmark, a corporation of Denmark
Filed Aug. 14, 1967, Ser. No. 660,507
Claims priority, application Denmark, Aug. 23, 1966, 4,310/66
Int. Cl. H01j *39/12, 5/16;* G01j *3/50*
U.S. Cl. 250—226
7 Claims

ABSTRACT OF THE DISCLOSURE

The invention relates to a method of determining the quality of meat based on the color and avoiding the error due to the color change of a meat surface influenced by air. A cutting probe is inserted into the meat and the color of an interface produced by the cutting is immediately compared with a color standard chosen according to the circumstances.

---

The invention also relates to a device in the form of an endoscope-like probe having cutting means, illuminating means and means for comparing the light reflected from or passing through an interface of the meat with a color standard valid for the light and the meat.

The invention relates to a method of determining the quality of meat.

In the meat industry, an evaluation of the progeny of given animals serves as a guidance in determinig the type of animal to be used as breeding animals. The method used to date, which is based on cutting out test samples is complicated, uneconomical and time-consuming. Moreover, it is unreliable, since it is not effected until such time when the carcasses have been cut up, at which stage it may be difficult to identify from which animal the particular part of the carcass originates.

It is the object of the invention in question to provide both a method and a device by the means of which the existing drawbacks can to a large extent be eliminated or reduced.

The invention is based on the recognition of the fact that the evaluation of quality performed by the expert on the basis of pieces of meat that have been cut out from the carcasses, is in the main based on the color characteristics of the piece of meat involved. However, any evaluation based on the color characteristics is subject to a major degree of unreliability, particularly since it is a question of a subjective judgment, and also, because the evaluation is taking place under varying lighting conditions, e.g. dependent on the time of the year. Yet another factor contributing towards unreliability in the determination is to be found in the circumstance that said determination takes place at different times subsequent to the killing, so that the areas examined have been subjected to the influence of the air within periods of different durations.

The methods employed to date may give rise to errors and may cause losses not only in the improvement of the breeding, but in the industrial preparation of meat products as well. For example, losses in the industry may occur when establishing too late that raw material which has been processed into a certain finished product, was in fact of such a quality so as to have warranted its processing into another, more valuable final product, or vice versa. It is therefore of great economical importance to the industry for the quality of the meat to be established with a high degree of accuracy at the earliest moment possible.

According to the invention the drawbacks described above are remedied by inserting into the meat sample a cutting, endoscope-like probing instrument, through which instrument an interface of the meat sample can be observed and illuminating said interface of the meat sample by means of a source of light placed some distance from the interface, and arranged in a way so as to emit light of such a composition that a reading of the degree of quality can be made, which reading is based on the difference between this light and the light entering from the interface observed in the meat sample. When employing the method according to the invention, there is no need to postpone the determination of the quality until the killed animal is being cut up. This presents the industry with a major advantage, for the manner in which the meat is cut up depends on the finished product required, while this again depends on the quality of the meat involved. As far as the task of improving the breeding is concerned, it is of great importance that it will be possible to ascertain the animal's descent, which is done with the highest degree of certainty immediately after the killing, at which stage the risk of confusion is very slight.

The method offers the further advantage of not involving any substantial damage to the meat sample, which thus retains its value as opposed to a method by which a test piece has to be cut out. There is no uncertainty in the determination of the color due to the influence of oxygen in the air during periods of varying lengths, because the determination of the quality is carried out at the very moment when the probe is inserted. Simultaneously, interfering light, which may otherwise come from the outside and which might cause a certain degree of uncertainty in the quality determination, is excluded. The determination of the quality depends solely on the light emanated by one quite specific source of light, the frequency characteristic of which may be accurately predetermined.

The method has obviated the most annoying sources of error connected with the methods employed to date. However, there is one remaining error which may arise from a determination based on a subjective evaluation of the color characteristics only. With a view to averting such an error from occurring, a calibrated scale which is valid for a given light source and by means of which the degree of quality of the meat can be read on the basis of the color characteristics of the light entering from the interface of the meat sample, has been provided in accordance with an embodiment of the invention for a given type of meat sample.

Furthermore, the invention relates to a device to be used in said method and comprising an endoscope-like probe having a cutting front edge as well as the means for illuminating the interface of a meat sample lying next to a window fitted to the probe with light of such a composition that the quality of the meat can be determined on the basis of the color characteristics of the light coming from the interface and that originating from the light sources.

In an appropriate embodiment of the device, the probe is provided with a longitudinal, groove-like depression, V-shaped by preference, while the two lateral surfaces of the groove facing each other are provided with windows for illumination and means of observation respectively. By means of this construction, a small, invariable spacing between the windows has been ensured, which is expedient, particularly when the color determination takes place on the basis of transmitted light.

The device may be fitted with an eyepiece for observing the light coming from the interface under observation, and said eyepiece may be equipped with a built-in color scale which could be observed simultaneously with the light entering from the meat interface. In order to obviate a subjective evaluation during the determination of the quality, the device may be fitted with a photo-electric cell built into the probe so as to register the light coming from the interface, e.g. when employing an electrical measuring instrument.

The invention is explained further below with reference to the accompanying, purely diagrammatic drawing in which—

FIG. 1 shows a sectional view of a device according to the invention;

FIG. 2 shows part of another embodiment of a device according to the invention, and FIG. 3 shows a sectional view of a third embodiment of a device according to the invention.

1 in FIG. 1 designates a casing, designed as a handle for the device, in which casing a probe 2 is secured provided with a cutting point 3, and a lance 4 with a cutting point 5, and a built-in lamp 6, which, through a window 7 in the side of the lance facing the probe 2 is able to emit light through a window 8 in the probe 2.

In the illustration shown, the lamp 6, which is of the microtype, is supplied with current through leads 9 in which a switch member 10 is incorporated. The supply of current can be effected from the outside through a supply cable 11 connected to a cabinet which contains a battery and a measuring instrument 12. The measuring instrument 12 can be used for controlling the condition of the battery and thereby the emission of light from the lamp 6. However, in the illustration shown, its primary task is that of registering the current in the leads 13 connected to a photoelectric cell 14, which, via a mirror 15 is being illuminated by light coming from the lamp 16.

The lance 4 is so designed as to ensure an invariable spacing from the probe 6, so that the piece of meat subjected to observation, after the probe and the lance are inserted into the meat sample, always is of the same thickness.

In the device shown in FIG. 2, where only the front part is shown, the construction with a separate lance 4 shown in FIG. 1 has been avoided, the lamp 6 having been placed inside the probe 2.

FIG. 3 shows a sectional view of a third embodiment. The location of the sectional view is immediately behind the cutting point and shows the wall in the hollow probe 2 hatched, as well as the lamp 6 located behind a window 16 and disposed in a V-shaped groove and located opposite another window 17 in the opposite wall of the V-shaped groove. Behind the window there are means, not shown, which serve to register the light, which coming from the lamp 6 passes through the window 16 and through the part of the meat sample located in the groove, into which part of the meat the probe is inserted.

In order to facilitate cleaning, the bottom of the V-shaped groove is rounded off.

The device according to the invention may be designed in many other ways with a view to fulfilling such demands as it may have to meet in each individual case. Both a photo-electric cell, provided one is required, as well as the lamp may be accommodated in the handle of the device, in which case the light is being emitted from the lamp and passed on to the photo-electric cell by means of an optical device known per se, or by means of light conductors known per se, e.g. consisting of clear plastic rods.

The handle may also hold a battery and a measuring instrument. It is, however, preferred that the measuring instrument be mounted in such a way that it constitutes a unit separate from the device. This is in order to prevent the instrument from being thrown out of adjustment or being damaged as a result of the treatment the device receives while in use.

The device may be made of any suitable material. It would be expedient, however, if the cutting point of the probe were to be of steel with a possible surface coating of chromium.

The device is put into use by it being inserted successively at preselected points into the killed animal in such a manner that the observation windows are made to lie at the required depth. This can be determined by means of a scale, not shown, graduated e.g. into millimeters, or by means of a stopping member, not shown, which can be adjusted beforehand. Current is supplied to the lamp, and the light from the lamp, which has a spectral curve known in advance, strikes the part of the meat sample to be examined. The light which comes from the meat sample and which is being observed either directly or by means of a photo-electric cell, possesses a different spectral distribution curve than has the light directed towards the meat sample. It is on the basis of this curve that the color characteristics and thereby the quality of the meat are determined. If a photo-electric cell is employed, one may, on the basis of the sensitivity characteristics of the photo-electric cell, calibrate an associated current measuring instrument. Thus, on the basis of the deflection on the associated measuring instrument, one may obtain a reading which indicates whether the quality is superior or inferior to a given standard.

By means of inserting appropriate filters in the path of the light, one may ensure a particularly large deflection in such cases where the light received possesses a desired color characteristic.

What I claim is:

1. In a method for determining the quality of meat, the steps of inserting a cutting, probing instrument into the meat sample and illuminating a first interface of the meat sample by means of visible light; measuring the light transmitted through the meat and emanating from a second interface situated at a small distance from said first interface; and comparing the characteristics of the light illuminating the said first interface and the light emanating from said second interface, said comparison serving as a measure of the quality of the meat sample examined.

2. In a method as claimed in claim 1, the step of comparing the light coming from said meat sample with a calibration scale valid for the light source in operation.

3. A device for use in determining the quality of meat and comprising an endoscope-like probe having a cutting front edge and a window therein; means for illuminating a first interface of a meat sample next to said window fitted into the probe; means for collecting light emanating from a second interface situated a short distance from and opposite to said first interface; and means for measuring the characteristics of said collected light; the difference between the characteristics of the light illuminating said first interface and the light emanating from said second interface serving as an indication of the quality of the meat sample examined.

4. A device as claimed in claim 3, wherein said window and said illuminating means are arranged with a small, invariable spacing between them.

5. A device as claimed in claim 3, wherein said probe in the longitudinal direction is provided with a groove-like depression having windows facing each other for illumination and observation respectively.

6. A device as claimed in claim 3, wherein a photo-electric cell registering the light coming from said interface is built into the probe.

7. A device as claimed in claim 3, comprising a photo-electric cell and an electrical measuring instrument for measuring the current of the photo-electric cell.

References Cited

UNITED STATES PATENTS

| | | | |
|---|---|---|---|
| 2,112,056 | 3/1938 | Wappler | 128—7 |
| 2,763,935 | 9/1956 | Whaley et al. | 33—169 |
| 2,764,149 | 9/1956 | Sheldon | 128—6 |
| 3,203,310 | 8/1965 | Smith et al. | |

OTHER REFERENCES

"Optical Probe," Pig Progress, December 1962, page 11.

JAMES W. LAWRENCE, Primary Examiner

D. O'REILLY, Assistant Examiner

U.S. Cl. X.R.

256—241; 128—6; 17—1, 45